(12) United States Patent
Tsubouchi et al.

(10) Patent No.: US 6,494,169 B1
(45) Date of Patent: Dec. 17, 2002

(54) EVAPORATOR AND METHOD FOR MANUFACTURING SAME

(75) Inventors: Osamu Tsubouchi, Susono; Hiroshi Sugiura, Kariya; Takashi Amano, Susono, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/575,459

(22) Filed: May 22, 2000

(30) Foreign Application Priority Data

May 21, 1999 (JP) ............................................ 11-141806

(51) Int. Cl.⁷ .................................................. F28F 3/08
(52) U.S. Cl. .......................... 122/32; 165/166; 165/167
(58) Field of Search ....................... 122/32, 33; 62/513, 62/515; 165/115, 166, 167, DIG. 387, DIG. 390, DIG. 392

(56) References Cited

U.S. PATENT DOCUMENTS

| | | | | |
|---|---|---|---|---|
| 4,219,080 A | * | 8/1980 | Chaix et al. | 165/166 |
| 4,693,302 A | * | 9/1987 | Dodds | 165/115 |
| 4,872,578 A | * | 10/1989 | Fuerschbach et al. | 165/166 |
| 5,429,183 A | * | 7/1995 | Hisamori et al. | 165/167 |
| 6,179,051 B1 | * | 1/2001 | Ayub | 165/167 |

FOREIGN PATENT DOCUMENTS

JP          11-63429          3/1999

* cited by examiner

*Primary Examiner*—Gregory Wilson
(74) *Attorney, Agent, or Firm*—Oblon, Spivak, McClelland, Maier & Neustadt, P.C.

(57) ABSTRACT

An evaporator which is small, light and whose activating time is short. The evaporator has an atomizer for atomizing a fluid being supplied into a conduit for the fluid to be heated in a plate type heat exchanger. To produce the evaporator, a metal plate is bent in a U shape, a heat exchanger module unit is produced by connecting a flow blocking member to one end of the U-shaped plate; a first interval maintaining member is attached to an outside surface of each of the plates; a second interval maintaining member is attached to an outside surface of each of the plates; and a plurality of said heat exchanger modules is arranged in a piled parallel relationship, with the first and second interval maintaining members maintaining a predetermined interval between the plates.

5 Claims, 4 Drawing Sheets

EVAPORATOR AND METHOD FOR MANUFACTURING SAME

BACKGROUND OF THE INVENTION

1. Field of the Invention

This invention relates to an evaporator, and more particularly to an evaporator for a fuel cell system, whose size is small, weight is low and activating time is short. This invention also relates to a manufacturing process of the evaporator.

2. Description of the Related Art

It Air contamination caused by exhaust gases from automobiles is a critical problem. Electric vehicles have been suggested as a countermeasure for exhaust from automobiles. But electric vehicles have not become commercially viable due to the necessity of frequent charging.

In recent years, automobiles equipped with fuel cells generating electricity by reverse reaction of electrolysis using hydrogen and oxygen are being developed as an environmentally acceptable alternative vehicle, which does not discharge anything except water. A disadvantage of automobiles with this arrangement is that a heavy and bulky hydrogen gas cylinder or hydrogen reservoir made of alloy is required, which is not acceptable in automobiles.

Due to the reasons mentioned above, automobiles equipped with a fuel cell, and using hydrocarbon fuel, are considered to be the most promising environmentally acceptable vehicles. Methanol is the most applicable hydrocarbon fuel being used in fuel cells. A fuel cell of the above mentioned arrangement exhausts less wastes, other than carbon dioxide. The amount of discharged carbon dioxide from such a fuel cell is the same as that of an electric vehicle, taking account of the amount of carbon dioxide discharged when producing electricity at power plants. Introduction of fuel cells using hydrocarbon fuel is thus a countermeasure to global warming.

Aforementioned fuel cell generates electricity using a reformed gas whose principal element is hydrogen derived from steam and methanol (hydrocarbon fuel), and which is reformed using a catalyst (such as a Cu-Zn catalyst). Improving the efficiency of the vaporization of water and methanol improves the efficiency of the fuel cell. Particularly, for use in an automobile, an evaporator is required to be small in size and to evaporate the fuel as completely as possible.

Water and methanol vaporized by the evaporator are used as the fuel of the fuel cell. If the time required to activate the evaporator is shortened, the activating time for the fuel cell is also shortened.

As a prior art technique for evaporating a liquid, a device is shown in a Japan Patent Laid-open Publication H11-63429 (published on Mar. 5, 1999). This shows a water pipe group combustion type boiler in which many water pipes are disposed, and water in the water pipes is vaporized by heating the water pipes with combustion gas. However, this conventional evaporator has disadvantages. It reserves water (fluid to be heated) in water pipes in advance to ensure the resistance of the water pipe against combustion heat. In addition to the thermal capacity of the evaporator, since this structure requires a quantity of heat as latent heat of the fluid to be heated when activating, it takes a relatively long time to activate the evaporator.

A smaller air space in the water pipe, due to the space being occupied with the reserved fluid to be heated, lowers the boiling point in the evaporator of the conventional arrangement. This could cause the problem of incomplete combustion gas due to a halt of the combustion reaction on the surface of the water pipe. To achieve complete combustion, a large fuel space is needed. This further enlarges the size of the evaporator.

To prevent condensation of the vapor in the conduit conveying the vapor, and in equipment which utilizes the vapor such as a reformer converting vaporized fluid into reformed gas, superheated vapor which is heated to a predetermined high temperature higher than the boiling point of the vapor is required. In the conventional evaporator, vapor from the fluid to be heated reserved in the conduit remains saturated (which temperature is lower than superheated vapor). To obtain the superheated vapor, the conventional evaporator requires a superheating device. This enlarges the size of the evaporator.

Shell and tube type conventional evaporators need larger capacity in the heat transfer area for heat exchange. This also enlarges the size of the evaporator.

SUMMARY OF THE INVENTION

Accordingly, it is an object of this invention to reduce the size and weight of an evaporator.

It is a further object of this invention to shorten the activating time of the evaporator.

It is yet another object of this invention to provide an improved method for manufacturing the evaporator.

To solve the aforementioned and other problems, the evaporator of this invention includes a plate type heat exchanger comprising a plurality of piled plates defining a first conduit for a fluid to be heated and a second conduit for a heating fluid, the first and second conduits each having an approximately rectangular shaped section and being formed between said plates; and an atomizer mounted to supply the fluid to be heated to the first conduit.

The heat resistance of the heat exchanger is therefore ensured since the atomized fluid to be heated is supplied evenly in the entire interior of the conduit for the fluid to be heated.

The activating time can be shortened because there is no need to heat reserved fluid in liquid phase in the conduit for the fluid to be heated. Atomization of the fluid to be heated improves the thermal efficiency of vaporization because the increase of the surface area of the fluid to be heated facilitates vaporization.

A temperature gradient which distributes the high temperature at the supply side of the heating fluid and the low temperature at the supply side of the fluid to be heated is generated on plate portion due to the supply of the atomized fluid to be heated. This keeps the high temperature of the supply side of the heating fluid, reduces the influence of the reaction halt of the combustion gas, and makes it possible to achieve complete combustion in a smaller combustion space. These factors enable one to minimize the size of the evaporator.

Another aspect of this invention includes a first opening of the conduit for the fluid to be heated located on top surface of a plate type heat exchanger, a second opening of the conduit for the fluid to be heated located on a side portion of the plate type heat exchanger, an atomizer supplying the atomized fluid to be heated to said second opening, a third opening of a conduit for the heating fluid located on the bottom of the plate type heat exchanger, and a fourth opening of the conduit for the heating fluid located on the opposite side of the second opening, for supplying the heating fluid therethrough.

Accordingly, a positive temperature gradient in the vertically upward direction is generated because the fluid to be heated in the plate type heat exchanger is vaporized, high temperature vaporized fluid to be heated moves to the top part of the exchanger and the heating fluid moves to the bottom part of the exchanger. This generates superheated vapor since the vapor of the fluid to be heated is heated in a high temperature atmosphere.

A further aspect of the evaporator of this invention includes a fluid partition wall disposed in the middle of a conduit for the heating fluid for controlling the flow of the heating fluid in the vertical direction. Each plate of the heat exchanger can be heated evenly because the smooth flow of the heating fluid in the conduit separated by the fluid partition wall increases the heat transfer efficiency of the plate. This improves the thermal efficiency of the plate type heat exchanger and minimizes the size of the evaporator.

According to a further aspect of this invention, the plate type heat exchanger comprises a plurality of piled parallel heat exchanger modules, each of said modules comprising a U-shaped metal plate, and a flow blocking member positioned on an inside surface of said U-shape between said plates to block fluid flow at one end of said first conduit; a first interval maintaining member blocking the fluid flow towards top opening of the U-shaped member; and a second interval maintaining member blocking the fluid flow towards the sectional opening of the U-shaped member, the first and second interval maintaining members maintaining a predetermined interval between the piled parallel heat exchanger modules. There is no necessity of welding because of the structure of the plate formed by bending a metal plate, which makes the manufacturing process easier, reduces cost, minimizes the risk of leakage of fluid and gains heat resistance compared to the conventional plate type using two flat plates and a member maintaining the space with a predetermined interval between said two plates.

Another aspect of this invention includes an L-shaped member which includes the first interval maintaining member and the second interval maintaining member formed in one piece therewith, the first interval maintaining member blocking the fluid flow towards the opening of the top surface of the plate type heat exchanger and the second interval maintaining member blocking the fluid flow towards the opening of U shape on the side portion of the plate type heat exchanger. The structure of the interval maintaining members formed in one piece enables one to reduce the cost of manufacturing the interval maintaining members and to avoid leaks.

Still another aspect of this invention includes a metal plate being bent in a U shape, the first interval maintaining member blocking the fluid flow towards the opening of the top of the plate type heat exchanger as well as maintaining the predetermined interval between each plate, and the second interval maintaining member blocking the fluid flow towards the sectional opening of U shape on the side portion of the plate type heat exchanger and maintaining the space between each plate. Thus there is no necessity of welding because of the structure of this plate formed by a bent metal plate, which makes the manufacturing process easier, reduces the cost, minimizes the risk of leakage, and gains heat resistance compared to conventional plate type using two flat plates and a member supporting the space with a predetermined interval between the two plates.

BRIEF DESCRIPTION OF THE DRAWINGS

These and other objects and features of the invention will be more apparent and more readily appreciated from the following detailed description of the preferred embodiment of the invention with the accompanying drawings, in which.

DESCRIPTION OF THE PREFERRED EMBODIMENT

Figure 1:
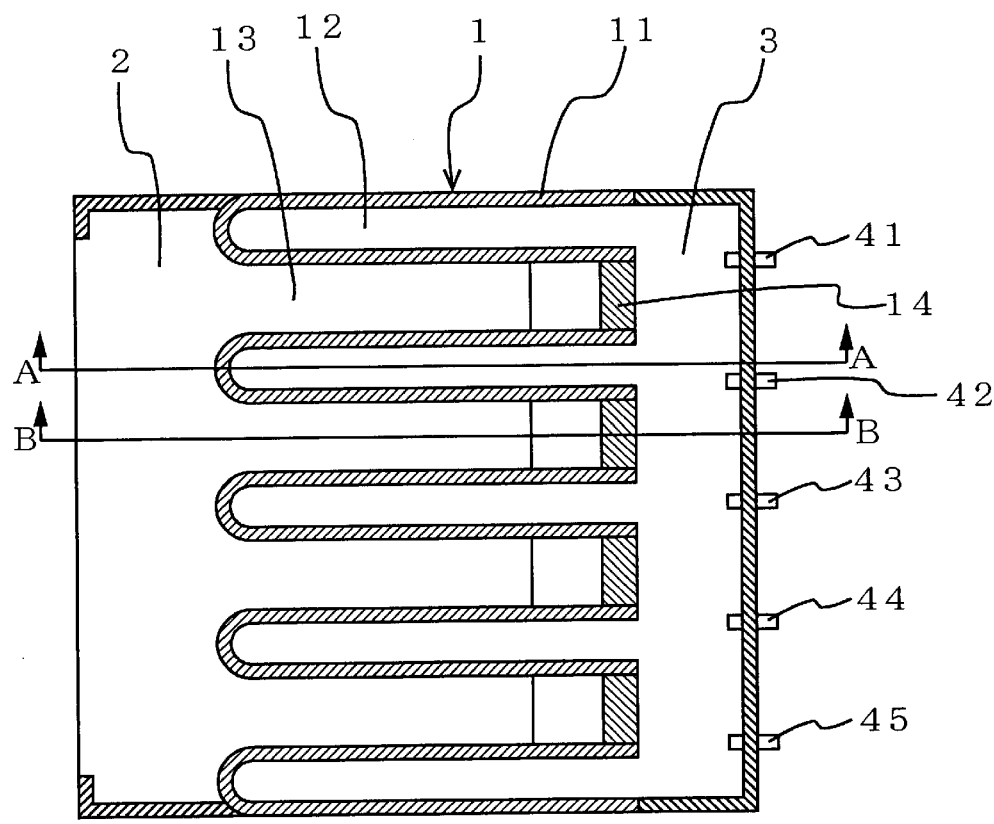
FIG. 1 is a cross sectional view, illustrating outline of an embodiment of an evaporator according to this invention.

An embodiment of an evaporator of this invention is described as follows. Referring to FIGS. 1 through 5, FIG. 1 shows a horizontal cross sectional view of an evaporator according to this invention. A combustion space 2 is disposed on one end (on the left side on FIG. 1) of a plate type heat exchanger 1. An atomization chamber 3 which supplies atomized fluid to be heated to a conduit 12 for the fluid to be heated is disposed on the other end (on the right side on FIG. 1) of the plate type heat exchanger. Spray nozzles 41 through 45 are disposed in the side wall of the atomization chamber 3 for supplying and atomizing the fluid (e.g., water or methanol) to be heated. A combustion burner (not shown) is disposed next to combustion space 2. The combustion space 2 receives combustion gases from the combustion burner.

The plate type heat exchanger 1 has a plurality of U-shape bent metal plates 11, and L-shaped members 14 gas tightly connecting the plates 11. Each plate 11 and each L-shaped member 14 are arranged alternately. The interior of the plate 11 serves as the conduit 12 for the fluid to be heated, where the fluid to be heated flows. A space between plates 11 serves as a conduit 13 for the heating fluid, where combustion gas flows.

Figure 2:
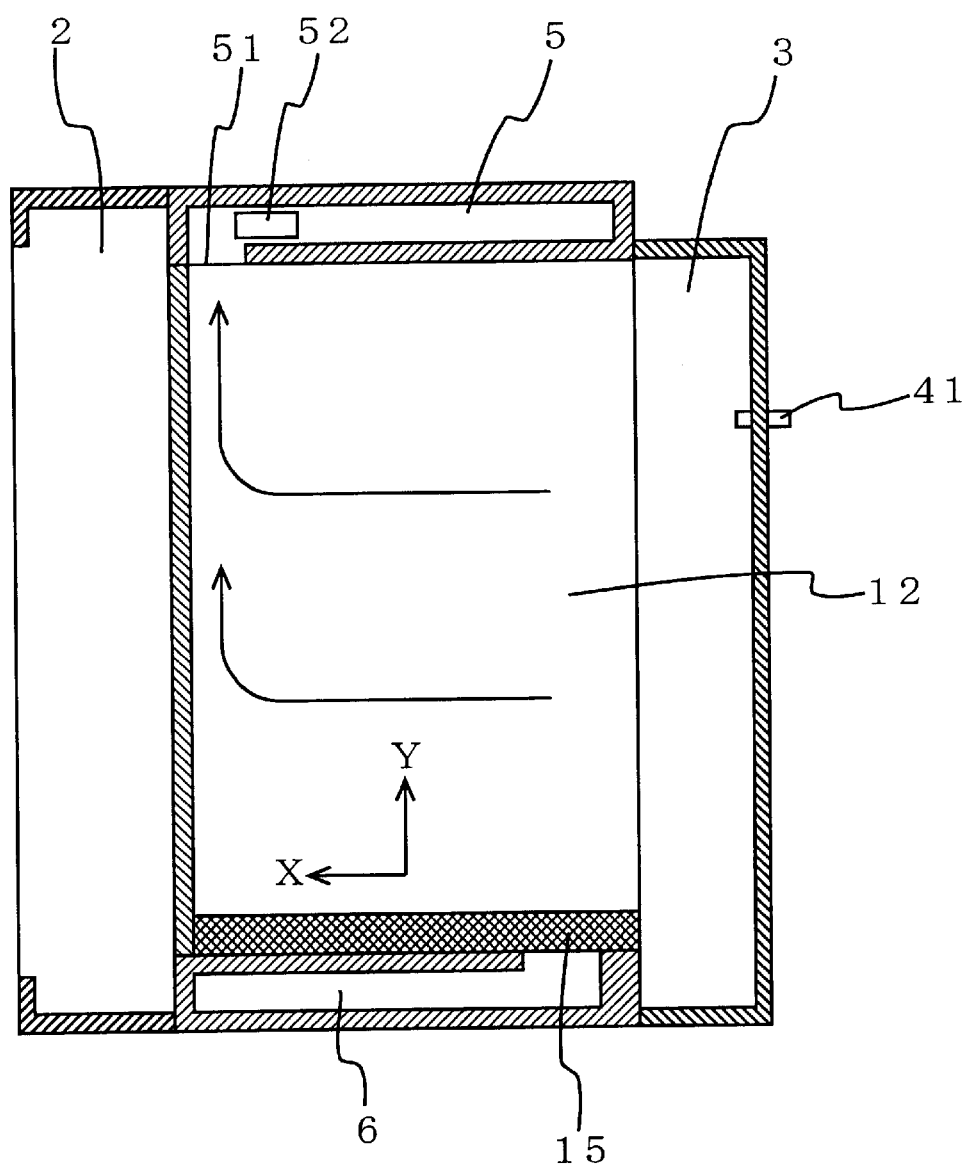
FIG. 2 is a profile view taken on line A—A of FIG. 1.
Figure 3:
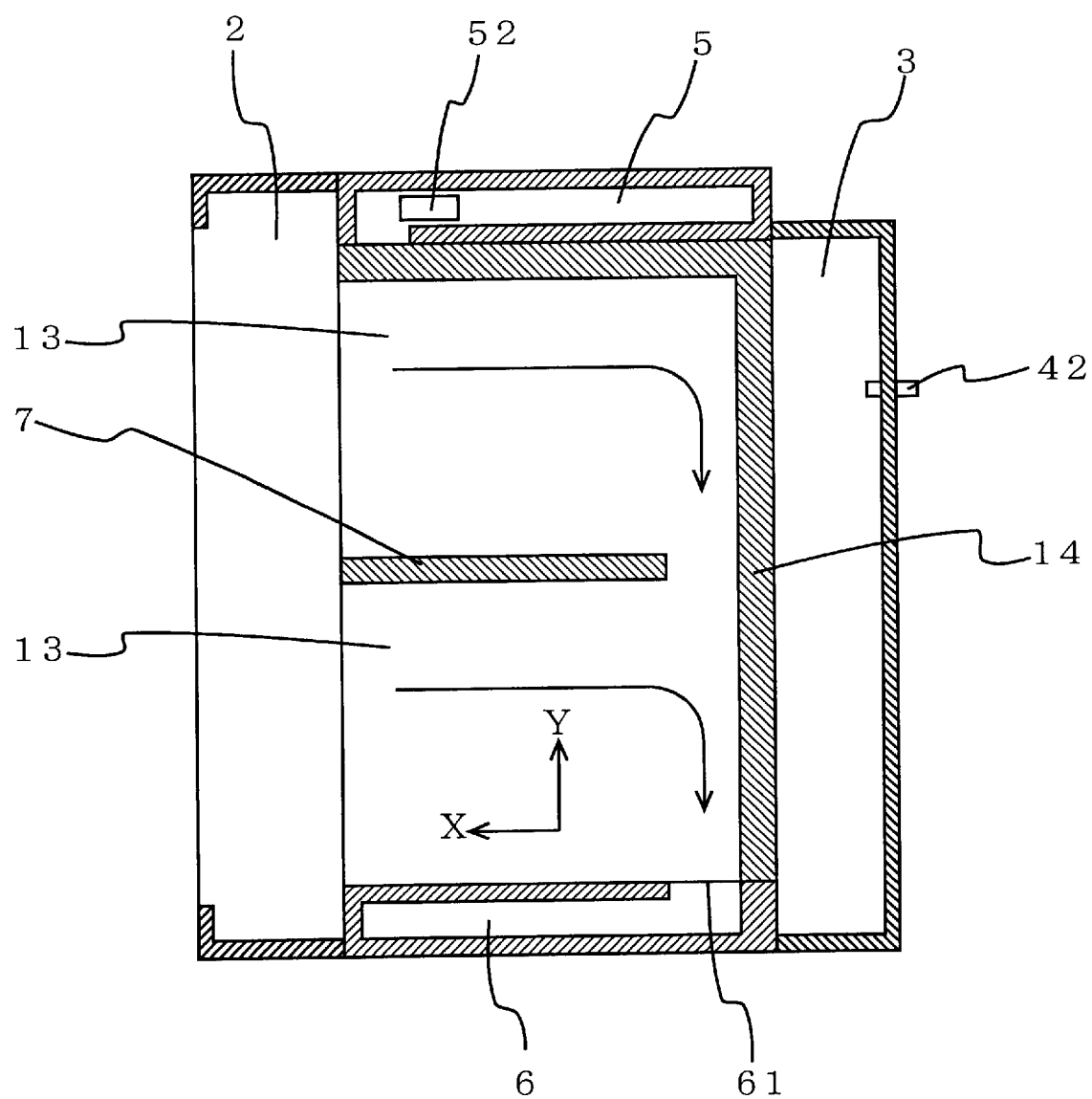
FIG. 3 is a profile view taken on line B—B of FIG. 1.

FIG. 2 shows a cross sectional view of the evaporator of this embodiment, taken on line A—A in FIG. 1. FIG. 3 shows a vertical cross sectional view of the evaporator of this embodiment, taken on line B—B in FIG. 1. FIG. 2 shows an interior view of the conduit for the fluid to be heated and FIG. 3 shows an interior view of the conduit 13 for the heating fluid. The vertically upward direction (indicating the direction from bottom to the top as viewed in both FIG. 2 and FIG. 3) is defined as the Y-direction. The direction at right angles to the Y-direction (direction from the atomization chamber 3 toward the combustion space 2 in both FIGS. 2 and 3) is defined as the X-direction.

A vapor gathering chamber 5 is disposed on the top of the plate type heat exchanger 1. The vapor gathering chamber 5 is connected to the conduit 12 for the fluid to be heated via an inlet port 51. The vapor gathering chamber 5 is connected to an external equipment (not shown) utilizing the vaporized fluid to be heated, via an outlet port 52. In the case of a fuel cell, a reformer converting said vaporized fluid into reformed gas is used as the external equipment.

An exhaust chamber 6 for the heating fluid is disposed under the plate type heat exchanger 1. The exhaust chamber 6 is connected to the conduit 13 for the heating fluid via an inlet port 61. The exhaust chamber 6 discharges the heating fluid outside via an outlet port (not shown).

The spray nozzles 41 through 45 are disposed above a mid-height position of the wall of the atomizing chamber 3. Since the fluid atomized from the spray nozzles 41 through 45 falls by gravity, the nozzles need to be disposed on higher position. A blocking member 15 for the fluid to be heated, which blocks the fluid from flowing into the exhaust chamber 6, is disposed on the bottom of each U-shaped plate 11.

The L-shaped member 14 disposed between plates 11 blocks the flow of the heating fluid towards the conduit 12 for the fluid to be heated and in the direction opposite to the blocking member 15 for fluid to be heated. A fluid partition wall 7 which controls the vertical flow of the heating fluid is disposed in the middle of the conduit 13 for the heating fluid. The fluid partition wall 7 separates the conduit 13 into two sections.

FIGS. 1 through 3 are schematic sketches of the evaporator of this embodiment. A fewer number of plates 11 and spray nozzles 41 through 45 are shown in the Figures, and the size of those are bigger than the real equipment, for easier understanding.

Figure 4:
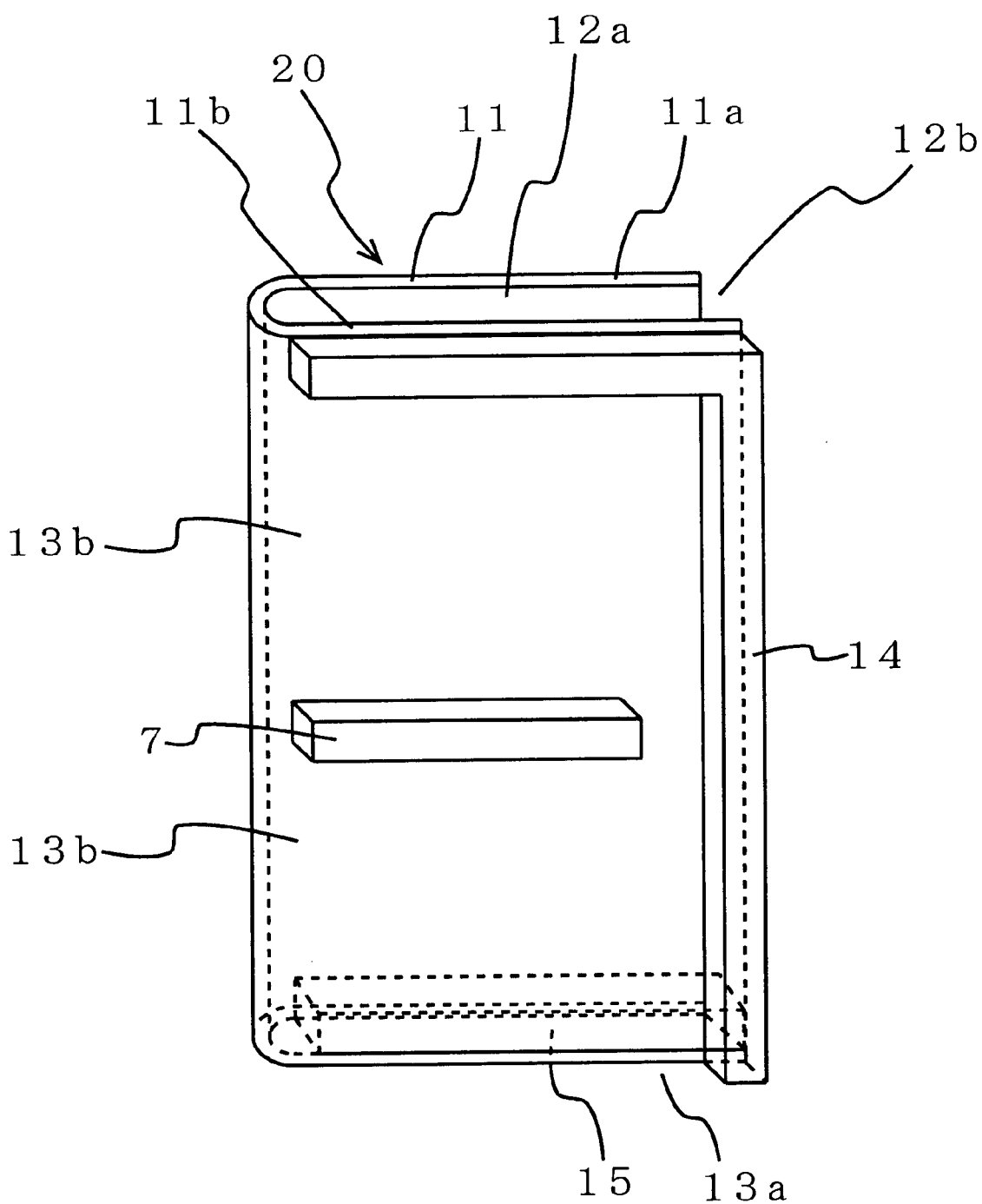
FIG. 4 is a perspective view, showing a plate of a plate type heat exchanger according to an embodiment of this invention.

FIG. 4 explains the manufacturing process of the plate type heat exchanger 1 of this embodiment. First, a plate 11 is formed by bending a metal plate. Second, a blocking member 15 for fluid to be heated is welded to block the bottom of the interior U-shaped part of each plate 11, which interior will serve as the conduit 12 for the fluid to be heated. The conduit 12 for the fluid to be heated has a first opening 12a on the top surface of the plates 11 and a second opening 12b at the right side (as seen in FIG. 4) of the plates.

Third, an L-shaped member 14 for maintaining the space between heat exchange modules is welded to an outside face of plate 11 so that it will be positioned between the U-shaped plates 11 to plate 11b. The L-shaped member 14 closes the conduit 13 for the heating fluid and blocks the flow of the heating fluid towards the top surface of the plate type heat exchanger 1 (a first interval maintaining member) and into the atomizing chamber 3 (a second interval maintaining member). The conduit 13 has a third opening 13a at the bottom and a fourth opening 13b at left side (as seen in FIG. 14) of the plate type heat exchanger 1. Since the first interval maintaining member and the second interval maintaining member are formed in one piece by the L-shaped member 14, an evaporator of this embodiment can reduce the possibility of fluid leakage and the cost for manufacturing the interval maintaining members.

Fourth, one surface of the fluid partition wall 7 is welded in the longitudinal direction to the middle of outer surface of the plate 11b. The conduit 13 is separated into two spaces by doing this, which reduces the part of the heating fluid which is difficult to be heated and makes it possible to heat the plate evenly. This improves the thermal efficiency of the plate type heat exchanger 1 and reduces the size of the evaporator. A heat exchanger module unit 20 is thereby manufactured.

Fifth, a fixed number of the heat exchanger module units 20 are arranged or piled on one another, thereby producing an evaporator having a combustion space 2, an atomization chamber 3, a vapor gathering chamber 5, and an exhaust chamber for the heating fluid 6. A gap formed between L-shaped members 14 and plates 11 or blocking members 15 for fluid to be heated and plates 11 is sealed by welding.

Combustion gas combusted in combustion space 2 is emitted to the outside of the evaporator via the conduit 13 and the exhaust chamber 6. Since the fluid partition wall 7 creates two flows of the heating fluid in the conduit 13 to smooth the fluid flow, the combustion gas flows evenly through the conduit 13 and heat the plates 11 evenly. Although only one fluid partition wall 7 is arranged in this embodiment, there can be more than one and their position can be changed, as long as plural flows are created.

Fluid to be heated is atomized by spray nozzles 41 through 45 and supplied to the conduit 12. The atomized fluid to be heated in the conduit 12 starts evaporating rapidly due to its large surface area. Latent heat of vaporization cools down the heat exchanger 1, which ensures its refractory strength.

In the conventional evaporator, fluid to be heated needed to be reserved in liquid phase to help the heat resistance of the conduit. The structure of the evaporator adopted in this invention does not require reserved fluid in the conduit to be heated because atomized fluid functions as a cooler. This enables one to minimize the activating time of the evaporator since it does not require heating of a large amount of liquid. The increase of the surface area of the atomized fluid facilitates the vaporization of the fluid to be heated and improves the thermal efficiency at vaporization.

The fluid to be heated is vaporized, while passing through the conduit 12, to become superheated vapor whose temperature is higher than saturated vapor. The superheated vapor of the fluid of be heated is gathered in the vapor gathering chamber 5 via inlet port 51. Vapor gathered in the vapor gathering chamber 5 is supplied to equipment such as a reformer which utilizes the superheated vapor.

In the plate type heat exchanger 1, a positive temperature gradient in the X direction is generated by the differential temperature between the high temperature combustion gas supplied from the combustion space 2 and the low temperature fluid to be heated supplied from the atomization chamber 3. The positive temperature gradient in the X direction enables one to keep the high temperature of a heating fluid supply and to reduce the possibility of a reaction halt lowering the combustion reaction of the combustion gas. The high temperature leads to complete combustion. The evaporator size can be minimized because of these effects.

In the bottom portion of the conduit 12, part of the fluid to be heated remains in the liquid phase (low temperature). The liquid of the fluid to be heated in the conduit 12 is vaporized by the heat of the heating fluid. Since the thermal energy is used for the latent heat of vaporization, the temperature of the bottom part of the conduit 12 is relatively low. The vapor rising to the top part of the conduit 12 is converted into superheated vapor by absorbing the heat from the heating fluid. This leads to a phase change of the fluid to be heated and generates a positive temperature gradient in Y direction in the plate type heat exchanger 1. As a result, the vapor is heated into higher temperature to generate more superheated vapor.

Table 1 shows the result of an experiment for an enclosure pressure at 1 atg when water is used as the fluid to be heated. The temperature of heat exchanger shows the temperature in the center of the plate type heat exchanger 1. The temperature of the vapor gathering chamber shows the temperature in the center of the vapor gathering chamber 5. The temperature of emitted vapor shows the temperature of the vapor at the inlet port of the equipment (a reformer in this embodiment) being supplied with the vaporized fluid to be heated. The temperature of water shows the water temperature supplied to the inlet port of the atomizer.

TABLE 1

|  | Temperature of Heat Exchanger | Temperature of Vapor Gathering Chamber | Temperature of Emitted Vapor | Temperature of Water |
| --- | --- | --- | --- | --- |
| Temperature (° C.) | 115.7 | 581.7 | 248.4 | 43.0 |

The temperature of the vapor gathering chamber is much higher than the temperature of the heat exchanger. This is due to the generation of a positive temperature gradient in both X and Y directions. The high temperature (581.7° C.) of the vapor gathering chamber and the high temperature (248.4° C.) of the emitted vapor are due to the generation of superheated vapor whose temperature is much higher than the water boiling point, 120° C., at 1 atg.

In this embodiment, a plate 11 is formed by bending a metal plate. Since this structure does not require welding two plates, manufacturing is easier and the cost for producing the evaporator can be reduced compared to the widely used structure in which flat plates and members forming the space with a predetermined interval, and a conduit, are piled alternately. The bent structured plate is capable of preventing leakage of the fluid and of resisting heat. When the bent portion is positioned on the combustion space side, the function mentioned above becomes more effective.

It is intended that the foregoing detailed description be regarded as illustrative rather than limiting and that it is understood that the following claims including all equivalents are intended to define the scope of the invention.

What we claim is:

1. An evaporator comprising:
    a plate type heat exchanger comprising a plurality of piled plates defining a first conduit for a fluid to be heated and a second conduit for a heating fluid, the first and second conduits each having an approximately rectangular shaped section and being formed between said plates; and
    an atomizer mounted to supply the fluid to be heated to the first conduit, wherein the first conduit has a first opening on a top surface thereof and a second opening on a side portion thereof, said atomizer being located at the second opening, and wherein the second conduit has a third opening on a bottom surface thereof and a fourth opening at a side thereof opposite to the second opening, wherein the heating fluid is supplied to the fourth opening.

2. The evaporator according to claim 1, wherein said second opening is located above a mid-portion of the vertical height of said first conduit.

3. The evaporator according to claim 1, further comprising a fluid partition wall mounted for controlling a flow of the heating fluid in the vertical direction and disposed in a mid-portion of the first conduit.

4. The evaporator according to claim 1, wherein the plate type heat exchanger comprises a plurality of piled parallel heat exchanger modules, each of said modules comprising a U-shaped metal plate, and a flow blocking member positioned on an inside surface of said U-shape between said plates to block fluid flow at one end of said first conduit; a first interval maintaining member blocking the fluid flow towards top opening of the U-shaped member; and a second interval maintaining member blocking the fluid flow towards the sectional opening of the U-shaped member, the first and second interval maintaining members maintaining a predetermined interval between the piled parallel heat exchanger modules.

5. The evaporator according to claim 4, wherein said first interval maintaining member and the second interval maintaining member together form an L-shaped interval maintaining member.

* * * * *